(12) United States Patent
Wiley et al.

(10) Patent No.: US 9,028,158 B2
(45) Date of Patent: May 12, 2015

(54) MULTI-STAGE FIBER PROCESSING SYSTEM AND METHOD

(75) Inventors: Robert G. Wiley, Franklin, TN (US);
Brett Clark, Whites Creek, TN (US);
John Lower, Lewisburg, TN (US)

(73) Assignee: 3SAE Technologies, Inc., Franklin, TN (US)

( * ) Notice: Subject to any disclaimer, the term of this patent is extended or adjusted under 35 U.S.C. 154(b) by 550 days.

(21) Appl. No.: 13/354,090

(22) Filed: Jan. 19, 2012

(65) Prior Publication Data

US 2012/0183266 A1   Jul. 19, 2012

Related U.S. Application Data

(60) Provisional application No. 61/434,060, filed on Jan. 19, 2011.

(30) Foreign Application Priority Data

Jan. 17, 2012 (WO) ................ PCT/US2012/021559

(51) Int. Cl.
G02B 6/255  (2006.01)

(52) U.S. Cl.
CPC ............ G02B 6/2551 (2013.01); G02B 6/2552 (2013.01)

(58) Field of Classification Search
CPC .... G02B 6/255; G02B 6/2551; G02B 6/2552; G02B 6/2553
See application file for complete search history.

(56) References Cited

U.S. PATENT DOCUMENTS

| | | | |
|---|---|---|---|
| 2,817,695 | A | 12/1957 | Hartwig |
| 3,761,764 | A | 9/1973 | Brady |
| 3,886,343 | A | 5/1975 | Desautels et al. |
| 3,960,531 | A | 6/1976 | Kohanzadeh et al. |
| 4,049,414 | A | 9/1977 | Smith |
| 5,018,824 | A | 5/1991 | Ooe et al. |
| 5,167,685 | A | 12/1992 | Fukuma et al. |
| 5,560,760 | A | 10/1996 | Toeppen |

(Continued)

FOREIGN PATENT DOCUMENTS

| | | |
|---|---|---|
| EP | 0262303 | 4/1988 |
| EP | 0480453 | 4/1992 |

(Continued)

OTHER PUBLICATIONS

Extended European Search Report dated Apr. 23, 2014 issued in corresponding European Application No. 08729281.9.

(Continued)

*Primary Examiner* — Rhonda Peace
(74) *Attorney, Agent, or Firm* — Onello & Mello, LLP

(57) ABSTRACT

A multi-stage fiber processing system comprises first and second fiber holders configured to hold respective portions of at least one fiber and a plurality of heat sources arranged between the first and second fiber holders and configured to provide a heat zone that axially extends about the at least on fiber. The first and second fiber holders can be configured to translate away from each other for tapering. The plurality of heat sources can include two 3 electrode heat sources that deliver an extended, substantially isothermic heat field axially about the fiber. All but one heat source can be turned off to splice the fiber. The two 3 electrode heat sources can generate 9 arcs to from the heat zone, wherein arcs between the two 3 electrode heat sources can be rotated about the at least one fiber.

54 Claims, 9 Drawing Sheets

(56) References Cited

U.S. PATENT DOCUMENTS

| | | | |
|---|---|---|---|
| 5,931,983 A * | 8/1999 | Bloom | 65/378 |
| 5,948,134 A * | 9/1999 | Bloom | 65/376 |
| 6,112,555 A * | 9/2000 | Bloom | 65/378 |
| 6,333,071 B1 | 12/2001 | Kobayashi et al. | |
| 6,742,939 B2 | 6/2004 | Sykora et al. | |
| 6,886,998 B2 | 5/2005 | Kasuu et al. | |
| 7,317,171 B2 | 1/2008 | Wiley | |
| 7,342,198 B2 | 3/2008 | Wiley | |
| 7,555,188 B2 | 6/2009 | Wiley et al. | |
| 7,670,065 B2 | 3/2010 | Clark et al. | |
| 7,922,400 B2 | 4/2011 | Clark et al. | |
| 7,985,029 B2 | 7/2011 | Wiley et al. | |
| 8,721,196 B2 * | 5/2014 | Wiley et al. | 385/96 |
| 2002/0136490 A1 * | 9/2002 | Zhang et al. | 385/33 |
| 2002/0176673 A1 | 11/2002 | Kasuu et al. | |
| 2003/0056547 A1 * | 3/2003 | Yamada et al. | 65/407 |
| 2005/0223748 A1 | 10/2005 | Ames et al. | |
| 2006/0263016 A1 | 11/2006 | Wiley et al. | |
| 2007/0031098 A1 | 2/2007 | Wiley et al. | |
| 2007/0045249 A1 | 3/2007 | Wiley | |
| 2007/0193983 A1 | 8/2007 | Wiley | |
| 2008/0022726 A1 * | 1/2008 | Harper et al. | 65/435 |
| 2008/0187273 A1 | 8/2008 | Clark et al. | |
| 2010/0135621 A1 | 6/2010 | Wiley et al. | |
| 2010/0226613 A1 | 9/2010 | Clark et al. | |
| 2011/0277511 A1 | 11/2011 | Wiley et al. | |
| 2012/0183266 A1 | 7/2012 | Wiley et al. | |
| 2014/0102148 A1 * | 4/2014 | Akasaka, Youichi | 65/407 |

FOREIGN PATENT DOCUMENTS

| | | |
|---|---|---|
| JP | 52-17039 | 2/1977 |
| JP | 55-91507 | 6/1980 |
| JP | 56-78812 | 6/1981 |
| JP | 58091403 | 5/1983 |
| JP | 62210410 | 9/1987 |
| JP | 2-7006 | 1/1990 |
| JP | 2118606 | 5/1990 |
| JP | 02208242 | 8/1990 |
| JP | 02287409 | 11/1990 |
| JP | 5-70166 | 3/1993 |
| JP | 05333227 | 12/1993 |
| JP | 111160565 | 6/1999 |
| JP | 2001124949 | 5/2001 |
| JP | 2001166175 | 6/2001 |
| JP | 200222898 | 1/2002 |
| JP | 2005263523 | 9/2005 |
| JP | 3983597 | 9/2007 |
| TW | 244338 | 4/1995 |
| WO | 2008098119 | 8/2008 |
| WO | 2011087508 | 7/2011 |
| WO | 2012097271 | 7/2012 |
| WO | 2012099883 | 7/2012 |

OTHER PUBLICATIONS

Japanese Office Action dated Mar. 13, 2012 issued in corresponding Japanese Application No. 2009-549238.
International Search Report dated May 31, 2012 issued in corresponding International Application No. PCT/US2012/021277.
International Search Report dated Mar. 14, 2012 issued in corresponding International Application No. PCT/US2012/021559.
International Search Report and Written Opinion dated Jan. 20, 2014, issued in corresponding International Application No. PCT/US2013/035665.
Halfpenny D.R., Kane D.M., "Electric-arc cleaning of optical-fiber endfaces", Applied Optics, 1996, vol. 35 Issue 22, pp. 4516-4517.
Furukawa Electric, "Fusion Splicers and Tools", FITEL, vol. 3, Oct. 2009, pp. 1-32.
International Search Report dated Aug. 30, 2010 issued in corresponding International Application No. PCT/US2010/021197.
International Search Report dated Jun. 27, 2008 issued in corresponding International Application No. PCT/US2008/053305.

* cited by examiner

MULTI-STAGE FIBER PROCESSING SYSTEM AND METHOD

CROSS REFERENCES TO RELATED APPLICATIONS

The present application claims priority under 35 USC 119 (e) from U.S. Provisional Patent Application 61/434,060 filed Jan. 19, 2011, entitled MULTI-STAGE FIBER PROCESSING SYSTEM AND METHOD, and U.S. International Patent Application No. PCT/US2012/021559 filed Jan. 17, 2012, entitled MULTI-STAGE FIBER PROCESSING SYSTEM AND METHOD. This application may be related to U.S. non-provisional patent application Ser. No. 12/688,489, filed Jan. 15, 2010, entitled MULTI-ELECTRODE SYSTEM WITH VIBRATING ELECTRODES, which is a continuation-in-part application of U.S. non-provisional patent application Ser. No. 12/027,394 filed Feb. 7, 2008, entitled Multi-Electrode System, which claimed priority under 35 U.S.C. §119(e) from co-pending, commonly owned U.S. provisional patent application Ser. No. 60/976,859 filed Oct. 2, 2007, entitled Multi-Electrode System In A Vacuum, U.S. provisional patent application Ser. No. 60/953,803 filed Aug. 3, 2007, entitled Three-phase Arc for Fiber Splicing and Improved Fiber Stripping, and U.S. provisional patent application Ser. No. 60/888,691 filed Feb. 7, 2007, entitled Three-Phase Arc for Large Diameter Fiber Splicing and Improved Fiber Stripping, the disclosure of each of which is incorporated herein in its entirety by reference.

This application may be related to U.S. non-provisional patent application Ser. No. 12/715,010, filed Mar. 1, 2010, entitled MULTI-ELECTRODE SYSTEM, which is a continuation application of U.S. non-provisional patent application Ser. No. 12/027,394 filed Feb. 7, 2008, entitled MULTI-ELECTRODE SYSTEM, which claimed priority under 35 U.S.C. §119(e) from co-pending, commonly owned U.S. provisional patent application Ser. No/ 60/976,859 filed Oct. 2, 2007, entitled MULTI-ELECTRODE SYSTEM IN A VACUUM, U.S. provisional patent application Ser. No. 60/953,803 filed Aug. 3, 2007, entitled THREE-PHASE ARC FOR FIBER SPLICING AND IMPROVED FIBER STRIPPING, and U.S. provisional patent application Ser. No. 60/888,691 filed Feb. 7, 2007, entitled THREE-PHASE ARC FOR LARGE DIAMETER FIBER SPLICING AND IMPROVED FIBER STRIPPING, the disclosure of each of which is incorporated herein in its entirety by reference.

FIELD OF INTEREST

The present inventive concepts relate to the field of fiber optics, and more particularly to systems and methods for processing optical fibers.

BACKGROUND

The advancement of the state of the art of fiber laser technology has been quite rapid over the past decade. The increasing availability of efficient, powerful pump laser diodes and the development of pump combiner devices and attendant optical matching components has pushed attainable output power and radiance to previously unseen levels. However, the tools for constructing such devices have not kept pace. Assembly of high-power fiber lasers and their components has remained a skilled craft, requiring lengthy manual processes and delivering low production yields.

Due to the high optical power levels involved, and especially with the development of cladding-pumped designs, the requirements for alignment, cleave quality, cleanliness, and correct splice, taper, and diffusion geometry are more stringent than even the most critical of previous lower-power applications. Cleave angle specifications for 125 µm telecom splices typically allow 1° or more of deviation from the perpendicular, compared to a high power splice which might require <0.25° on fibers which are more challenging to cleave. Optical losses of 0.1 dB, which might be acceptable for a splice in a telecom erbium-doped fiber amplifier (EDFA), will dissipate over 20 W in a kilowatt laser, causing explosive failure of the splice. As well as splicing, the assembly process may require various tapering procedures to create combiners and mode field adapted splices. These tapers must have correct adiabatic core geometry and in some cases a surface free of contaminants, which can cause destructive "hot spots."

In the 1990's, several manufacturers introduced fiber preparation and fusion splicing machines that enabled the high-volume production of EDFA's for the telecom boom. These machines employed varying degrees of fixturing and automation to drastically reduce the time and skill required to make low-loss, high-strength splices. However, by design these tools were limited to relatively small fibers, typically 250 µm maximum cladding diameter. Before these developments, hand alignment under optical microscopes and flame heat sources were the means used to splice fibers, just as they often are for the large diameter fibers of today's laser applications.

As fiber lasers begin to move from research and development (R&D) to volume production, there is a need to simplify, improve, and automate the steps required for their assembly, as was done for telecom applications. New cleaving and heat source technologies, implemented in a well designed workstation, comprise a substantial step forward in making high power laser manufacturing a high-yield, repeatable process. Flexible capabilities, including multi-axis positioning, wide field optics, and multi-application control software enable splicing, bundling, tapering, cleaving, and end-cap attachment to be performed on the same machine. However, even with such advancements, there remain limitations due to heat sources typically used in optical fiber processing, which increased automation have not resolved.

SUMMARY OF INVENTION

Provided are systems and methods using multiple stages of heat sources to generate a substantially uniform heat zone that extends along a fiber or fiber bundle. The stages may be operated in concert, e.g., for tapering or diffusion, or operated independently, e.g., for splicing. That is, only one stage could remain on for a splicing task.

In accordance with one aspect of the present invention, provided is a multi-stage fiber processing system comprises first and second fiber holders configured to hold respective portions of at least one fiber; and a plurality of heat sources arranged between the first and second fiber holders and configured to provide a heat zone that axially extends about the at least on fiber.

In a system according to aspects of the invention, at least one heat source of the plurality of heat sources can be a multi-electrode heat source.

In a system according to aspects of the invention, the plurality of heat sources can includes two 3 electrode heat sources.

In a system according to aspects of the invention, at least one of the 3 electrode heat sources can comprise 3 electrodes in a "Y" configuration.

In a system according to aspects of the invention, at least one of the 3 electrode heat sources can comprise 3 electrodes in a "T" configuration.

In a system according to aspects of the invention, for each 3 electrode heat source, a first arc can be formed between a first electrode and a second electrode, a second arc can be formed between the second electrode and a third electrode, and a third arc can be formed between the third electrode and the first electrode.

In a system according to aspects of the invention, wherein the two 3 electrode heat sources can be disposed in a 22" to 24" Hg gauge vacuum, 200 to 150 torr absolute.

In a system according to aspects of the invention, the two 3 electrode heat sources can be disposed in an oxygen-enriched partial vacuum with plasma at a temperature of not more than about 400° C.

In a system according to aspects of the invention, the plurality of heat sources can include two 3 electrode heat sources configured to generate nine arcs, including 3 arcs between the two 3 electrode heat sources.

In a system according to aspects of the invention, each of the nine arcs can be independently controlled.

In a system according to aspects of the invention, the system can be configured to rotate the 3 arcs between the two 3 electrode heat sources in a clockwise direction about an axis of the at least one fiber.

In a system according to aspects of the invention, the system can be configured to rotate the 3 arcs between the two 3 electrode heat sources in a counterclockwise direction about the axis of the at least one fiber.

In a system according to aspects of the invention, the system can further comprise a different transformer configured to drive each electrode of each of the 3 electrode heat sources.

In a system according to aspects of the invention, the system can further comprise a common transformer configured to drive at least one electrode from each of the 3 electrode heat sources.

In a system according to aspects of the invention, the heat zone can have a temperature up to about 3000° C.

In a system according to aspects of the invention, the heat zone can have a width in a range of 0 mm to 10 mm.

In a system according to aspects of the invention, the heat zone can be about 3 mm.

In a system according to aspects of the invention, the first fiber holder and second fiber holder can be translatable away from the heat zone.

In a system according to aspects of the invention, the heat zone can be a substantially uniform heated plasma field.

In a system according to aspects of the invention, the heat zone can be substantially isothermic.

In a system according to aspects of the invention, the at least one fiber can be a fiber bundle.

In a system according to aspects of the invention, the at least one fiber can be a large diameter fiber of 400 µm to 600 µm.

In accordance with another aspect of the invention, provided is a method of fiber processing, comprising holding respective portions of at least one fiber with first and second fiber holders, and providing an axially extending heat zone about the at least one fiber with a plurality of heat sources arranged between the first and second fiber holders.

In a method according to aspects of the invention, the method can further comprise tapering the at least one fiber by selectively translating the first and second fiber holder away from each other.

In a method according to aspects of the invention, the method can further comprise cleaving the at least one fiber, and splicing the at least one fiber with only one of the plurality of heat sources.

In a method according to aspects of the invention, the plurality of heat sources can include two 3 electrode heat sources.

In a method according to aspects of the invention, each 3 electrode heat source can comprise 3 electrodes in a "Y" configuration.

In a method according to aspects of the invention, each 3 electrode heat source can comprise 3 electrodes in a "T" configuration.

In a method according to aspects of the invention, forming the heat zone can comprise, for each 3 electrode heat source, generating a first arc is formed between a first electrode and a second electrode, generating a second arc is formed between the second electrode and a third electrode, and generating a third arc is formed between the third electrode and the first electrode.

In a method according to aspects of the invention, the method can include disposing the two 3 electrode heat sources in a 22" to 24" Hg gauge vacuum, 200 to 150 torr absolute.

In a method according to aspects of the invention, the plurality of heat zones can include two 3 electrode heat sources generating nine arcs, including forming 3 arcs between the two 3 electrode heat sources.

In a method according to aspects of the invention, the method can further comprise independently controlling each of the nine arcs.

In a method according to aspects of the invention, the method can further comprise rotating the 3 arcs between the two 3 electrode heat sources about an axis of the at least one fiber in a clockwise direction.

In a method according to aspects of the invention, the method can further comprise rotating the 3 arcs between the two 3 electrode heat sources about an axis of the at least one fiber in a counterclockwise direction.

In a method according to aspects of the invention, the method can further comprise using a different transformer configured to drive each electrode of each of the 3 electrode heat sources.

In a method according to aspects of the invention, the method can further comprise using a common transformer configured to drive at least one electrode from each of the 3 electrode heat sources.

In a method according to aspects of the invention, the heat zone can have a temperature up to about 3000° C.

In a method according to aspects of the invention, the heat zone can have a width in a range of 0 mm to 10 mm.

In a method according to aspects of the invention, the heat zone can be about 3 mm.

In a method according to aspects of the invention, the method can further comprise translating the first fiber holder and second fiber holder away from the heat zone.

In a method according to aspects of the invention, the heat zone can be a substantially uniform heated plasma field.

In a method according to aspects of the invention, the at least one fiber can be a large diameter fiber of 400 µm to 600 µm.

In a method according to aspects of the invention, the heat zone can be substantially isothermic.

In a method according to aspects of the invention, the at least one fiber can be a fiber bundle.

In a method according to aspects of the invention, the at least one fiber can be a large diameter fiber in a range of about 400 μm to 600 μm.

In accordance with another aspect of the invention, provided is a multi-stage fiber tapering system comprising first and second fiber holders configured to hold respective portions of at least one fiber and to translate away from each other, and first and second 3 electrode heat sources arranged between the first and second fiber holders and configured to provide a heat zone that axially extends about the at least on fiber, the heat zone being a substantially uniform heated plasma field.

In a system according to aspects of the invention, for each 3 electrode heat source, a first arc can be formed between a first electrode and a second electrode, a second arc can be formed between the second electrode and a third electrode, and a third arc can be formed between the third electrode and the first electrode.

In a system according to aspects of the invention, the system can further comprise a different transformer configured to drive each electrode of each of the 3 electrode heat sources.

In a system according to aspects of the invention, the system can further comprise a common transformer configured to drive at least one electrode from each of the 3 electrode heat sources.

In a system according to aspects of the invention, the system can further comprise at least one stepper motor arranged to translate at least one of the first and second fiber holders.

In a system according to aspects of the invention, the at least one fiber can be a fiber bundle.

In a system according to aspects of the invention, the at least one fiber can be a large diameter fiber of 400 μm to 600 μm.

In a system according to aspects of the invention, the plurality of heat sources can include two 3 electrode heat sources configured to generate nine arcs, including 3 arcs between the two 3 electrode heat sources.

In a system according to aspects of the invention, each of the nine arcs can be independently controlled.

In a system according to aspects of the invention, the system can be configured to rotate the 3 arcs between the two 3 electrode heat sources in a clockwise direction about an axis of the at least one fiber.

In a system according to aspects of the invention, the system can be configured to rotate the 3 arcs between the two 3 electrode heat sources in a counterclockwise direction about the axis of the at least one fiber.

BRIEF DESCRIPTION OF THE DRAWINGS

The drawing figures depict preferred embodiments by way of example, not by way of limitation. In the figures, like reference numerals refer to the same or similar elements.

DETAILED DESCRIPTION OF PREFERRED EMBODIMENT

Figure 1:
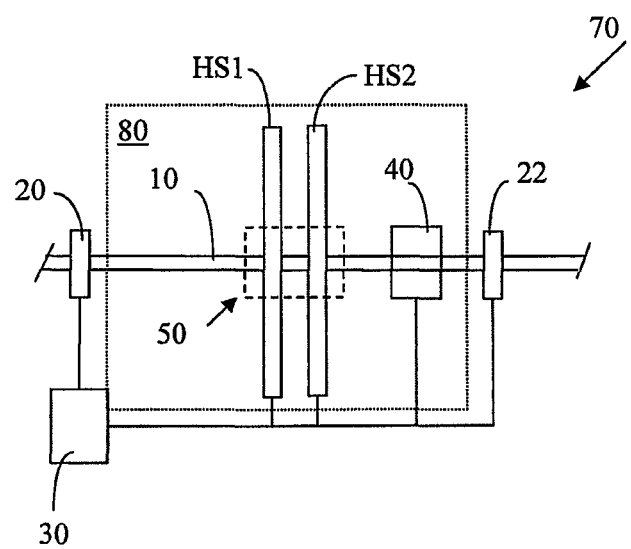
FIG. 1 is a multi-stage fiber processing system, in accordance with the present invention.

It will be understood that, although the terms first, second, etc. can be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In accordance with aspects of the present invention, provided is a multi-stage fiber processing system configured for providing an extended heat zone along an axis of at least one optical fiber. The extended heat zone may have various utilities, such as, for example, tapering the fiber, where one or both ends of the fiber can be pulled to create a desired taper originating in the extended heat zone. Such multi-stage fiber processing systems can also be useful in other contexts and applications, such as annealing, diffusion, splicing, and ablation.

The extended heat zone delivers a substantially isothermic (or uniform) distribution of heat about the fiber. In a presently preferred embodiment, the extended heat zone is formed using two 3 electrode heat sources, where the gap distances between the electrodes is the same. When properly configured, a total of 9 arcs are created among the six electrodes. Three arcs are generated between the three electrodes of each heat source, which account for six total arcs. And 3 arcs are generated between the two 3 electrode heat sources, which can be controlled to rotate about the fiber, in either of a clockwise or counterclockwise direction. The 9 arcs create a vortex having a substantially isothermic profile.

FIG. 1 provides an embodiment of a multi-stage fiber processing system 70, in accordance with aspects of the present invention. Multi-stage fiber processing system 70 is configured to process at least one fiber or fiber bundle 10 (collectively referred to as "fiber 10" herein), and includes at least two heat sources HS1 and HS2. Fiber 10 can be or include large diameter fibers (LDFs) having a diameter in a range of about 400 µm to 600 µm, and beyond, as well as smaller diameter fibers. The heat sources HS1 and HS2 combine to provide a heat zone 50 that is extended along an axis of the fiber 10. The heat zone is extended in that it is larger than the heat zone provided by only one heat source. The extended heat zone enables improved fiber processing without the need to create relative movement between a single heat source and the fiber to effectively extend the heat zone.

Fiber 10 may be secured at two points with first and second holding devices 20 and 22. For a tapering configuration both of devices 20 and 22 may be or include a clamp coupled to a translation mechanism, such as a stepper motor. However, in some embodiments, it is possible that only one of holding devices 20 and 22 includes a translation mechanism, while the other device can be a stationary clamp. In yet other embodiments, each of devices 20 and 22 can be stationary clamps, although this would not be particularly useful for tapering.

A controller 30 can be attached to one or both of holding devices 20 and 22 to controller their movement. A monitoring system 40, e.g., a vision system, can be used to monitor changes to fiber 10, e.g., for tapering or diffusion purposes, and provide feedback to controller 30. For example, when tapering, a vision system 40 can be used to ensure the desired taper has been achieved. The heat sources HS1 and HS2 can also be coupled to a controller, so control various aspects thereof. For example, when HS1 and HS2 are multi-electrode heat sources, the control can control the input power to the electrodes, which could be done on an individual electrode basis. The controller could be used to control the direction and intensities of arcs formed between the two (or more) 3 electrode heat sources—or other adjustable parameters of other heat sources. Such devices and controller can be coupled to a workstation or other computer for setting parameters, operator control, program control, and measurement, analysis, and monitoring.

In some embodiments, the heat sources HS1 and HS2 can be disposed in at least a partial vacuum 80. As an example, heat sources HS1 and HS2 can be disposed in a 22" to 24" Hg gauge vacuum, 200 to 150 torr absolute. As another example, heat sources HS1 and HS2 can be disposed in an oxygen-enriched partial vacuum with plasma at a temperature of not more than about 400° C.

In the preferred embodiment, the heat sources HS1 and HS2 include multi-electrode heat sources. Such multi-electrode heat sources can each include at least three electrodes. Three electrode heat sources have proven useful in a variety of fiber optic processing, as developed by 3SAE Technologies, Inc., Franklin, Tennessee, which are also the subject of U.S. Pat. No. 7,670,065, entitled Multi-Electrode System, which is referred to as the "Ring of Fire®" and can achieve fiber temperatures from less than 100° C. to greater than 3000° C. The actual temperature will be chosen based on fiber 10 and the intended operation, e.g., tapering, diffusion, splicing, annealing, and so on.

Figure 2A:
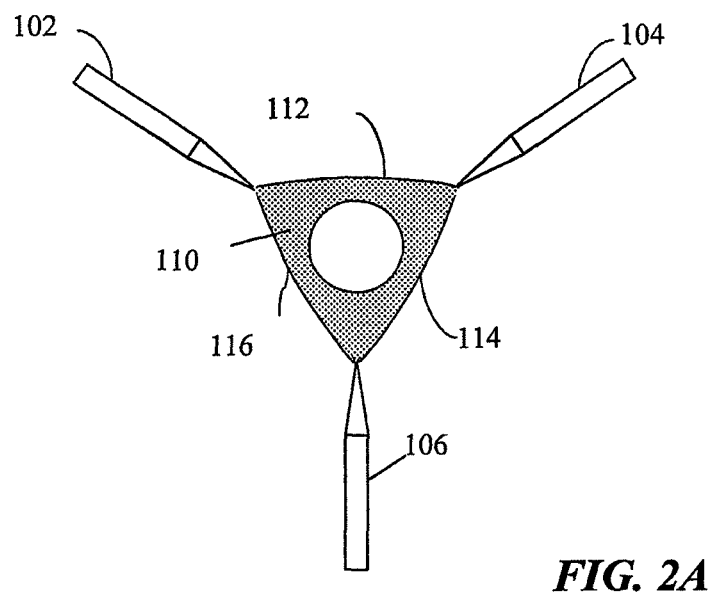
FIG. 2A is a diagram showing an embodiment of a three electrode stage in a "Y" configuration, in accordance with aspects of the present invention.
Figure 2B:
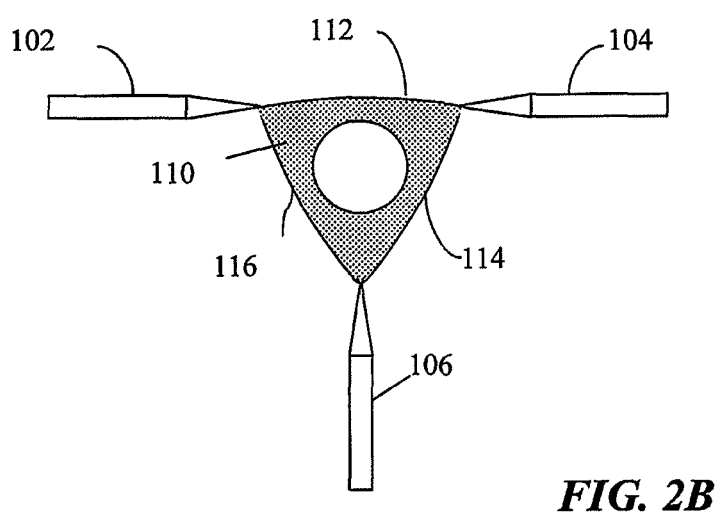
FIG. 2B is a diagram showing an embodiment of a three electrode stage in a "T" configuration, in accordance with aspects of the present invention.

FIG. 2A is a diagram showing an embodiment of a three electrode heat source stage in a "Y" configuration, in accordance with aspects of the present invention. FIG. 2B is a diagram showing an embodiment of a three electrode heat source stage in a "T" configuration, in accordance with aspects of the present invention. In some embodiments, the multi-stage fiber processing system 100 can include two 3 electrode heat source stages, or at least six electrodes, with at least 3 electrodes per stage.

In FIG. 2A, a multi-electrode heat source 100 includes three electrodes 102, 104, and 106 arranged in a "Y" configuration, where an arc is generated between each adjacent pair of electrodes. For example, an arc 112 is generated between electrodes 102 and 104; an arc 114 is generated between electrodes 104 and 106; and an arc 116 is generated between electrodes 106 and 102. The three arcs 112, 114, and 116 create a heated field 50 surrounding the fiber 10. The heated field 50 is preferably a substantially isothermic heated field. In some embodiments, the heated field 50 is a substantially uniform heated plasma field.

In FIG. 2B, a multi-electrode heat source 100' includes three electrodes 102, 104, and 106 arranged in a "T" configuration, where an arc is generated between each adjacent pair of electrodes. For example, as with multi-electrode heat source 100, an arc 112 is generated between electrodes 102 and 104; an arc 114 is generated between electrodes 104 and 106; and an arc 116 is generated between electrodes 106 and 102. The three arcs 112, 114, and 116 create a heated field 110 surrounding the fiber 110. The heated field 110 is preferably a substantially uniform heated field. In some embodiments, the heated field is a substantially uniform heated plasma field.

The heat zone created by a 3 electrode arrangement can be relatively narrow, e.g., 1 mm in width (at ½ max). Using multiple stages of 3 electrode heat sources effectively adds a $3^{rd}$ dimension to the heat zone, creating the extended heat zone or vortex. A wider heat zone has the advantage of reducing variation in the diameter of the tapered zone. The thermal profile of the extended heat zone can be controlled based on the spacing between heat sources and the power delivered to them. The axially narrow heat zone of a single stage of the three-phase "Ring of Fire®," which is shown in FIGS. 2A, and 2B, has advantages for many applications, but a broader heat source benefits applications such as Thermally Expanded Core splicing, post-splice fire polishing, and high ratio tapers. For such applications, the three electrode system can be expanded to a six-electrode configuration. In the six electrode system, there are two heat source stages HS1 and HS2, each with three electrodes.

Figure 3A:
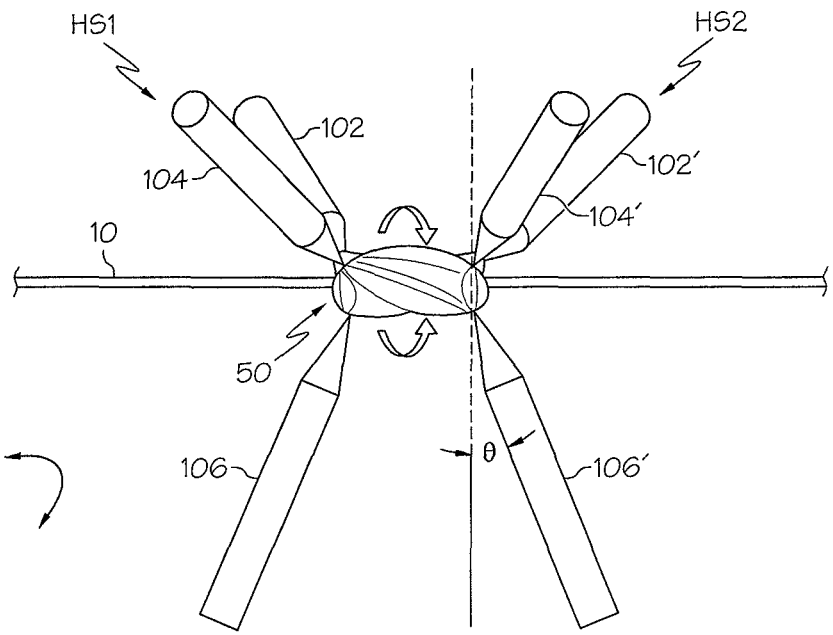
FIG. 3A is a generally side view of an embodiment of two heat source stages, where each heat source stage is a 3 electrode heat source.

FIG. 3A is a generally side view of an embodiment of two heat source stages HS1 and HS2, where each heat source stage is a 3 electrode heat source. In this embodiment, the 3 electrode heat sources are each in a "Y" configuration, as in FIG. 2A, with 120° between adjacent pairs. In this embodiment, each electrode 102, 104, 106 is pitched or tiled by an angle θ away from the heat zone 50, in a range between about 22.5° and 45° from vertical. In other embodiments, the electrodes 102, 104, 106 need not be tilted, or could be tilted less than 22.5°. While it is presently not envisioned as the best mode of practicing the invention, in still other embodiments, the electrodes 102, 104, 106 could be tilted at an angle greater than 45°.

In the view provided by FIG. 3A, it can be seen that 9 arcs are produced by the six electrodes 102, 102', 104, 104', 106, and 106'. Three arcs are generated between electrodes 102, 104, and 106, and three arcs are generated between electrodes 102', 104', and 106'. Additionally, 3 arcs are created between the two heat sources HS1 and HS2—to generate heat zone 50 as a substantially isothermic heated field around fiber 10. For the 3 arcs formed between the heat sources, one arc is formed between one electrode in heat source HS1 and one electrode of heat source HS2. As an example, a different arc can be formed between electrode 102 and 104'; electrode 104 and 106', and electrode 106 and 102'—for a total of 3 arcs formed between heat sources HS1 and HS2. The forming of these arcs can be accomplished to create an effect of the arcs (or heated field) rotating clockwise or counterclockwise around fiber 10. This is shown in FIG. 3A.

Figure 3B:
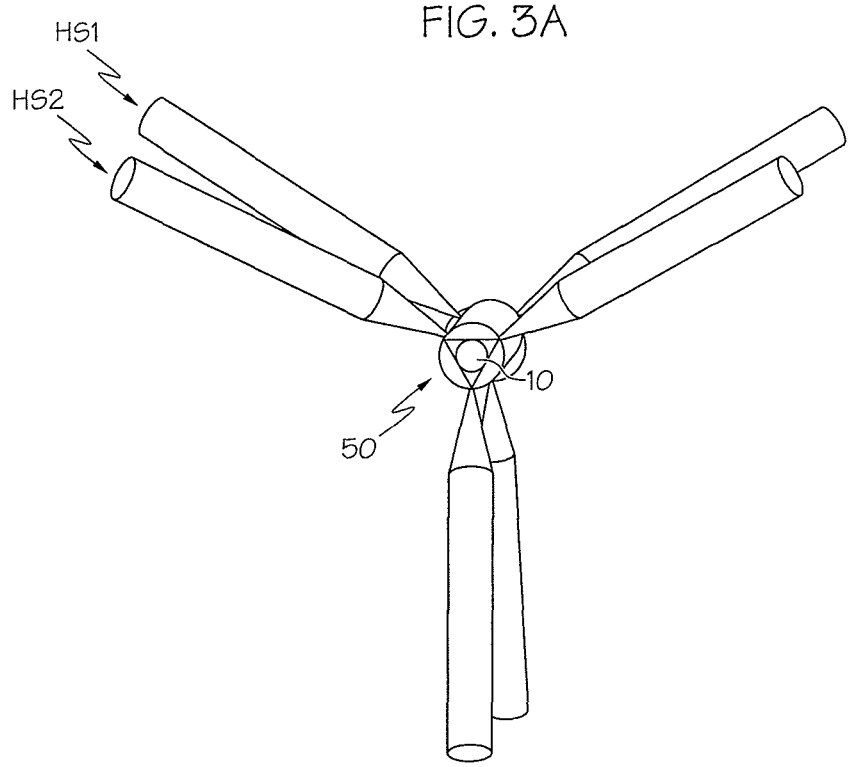
FIG. 3B is a view of the 3 electrode heat source of FIG. 3A, but from a view that is generally along the axis of the fiber.

FIG. 3B is a view of the 3 electrode heat source HS1 and HS2 of FIG. 3, but from a view that is generally along the axis of the fiber 10. In this view, the fiber would come out of the page. As can be seen, the extended heat zone 50 created by the six electrodes (3 electrodes per heat source stage) surrounds fiber 10.

In the preferred embodiments, the multi-electrode heat source includes a digitally-controlled three-phase high-voltage source driving three tungsten electrodes 102, 104 106. The points of the electrodes form an equilateral triangle, and the resulting plasma discharge forms in a substantially triangular shape about their mutual center and perpendicular to the fiber axis. In the preferred embodiments, the electrode spacing can be varied from 1 mm to 3 mm or more, depending on the desired transverse width of the heat zone. Closer spacing provides more stability at lower input power. Wider spacing provides even heating of larger fibers. The system can be adjusted from very low power (suitable for splicing of <80 µm fibers, as an example) to a maximum of 150 W of input power, which will easily splice and taper 2mm fibers and bundles. The effective width of the heat zone along the fiber axis varies with input power, is from ~50 µm to 500 µm.

Figure 4:
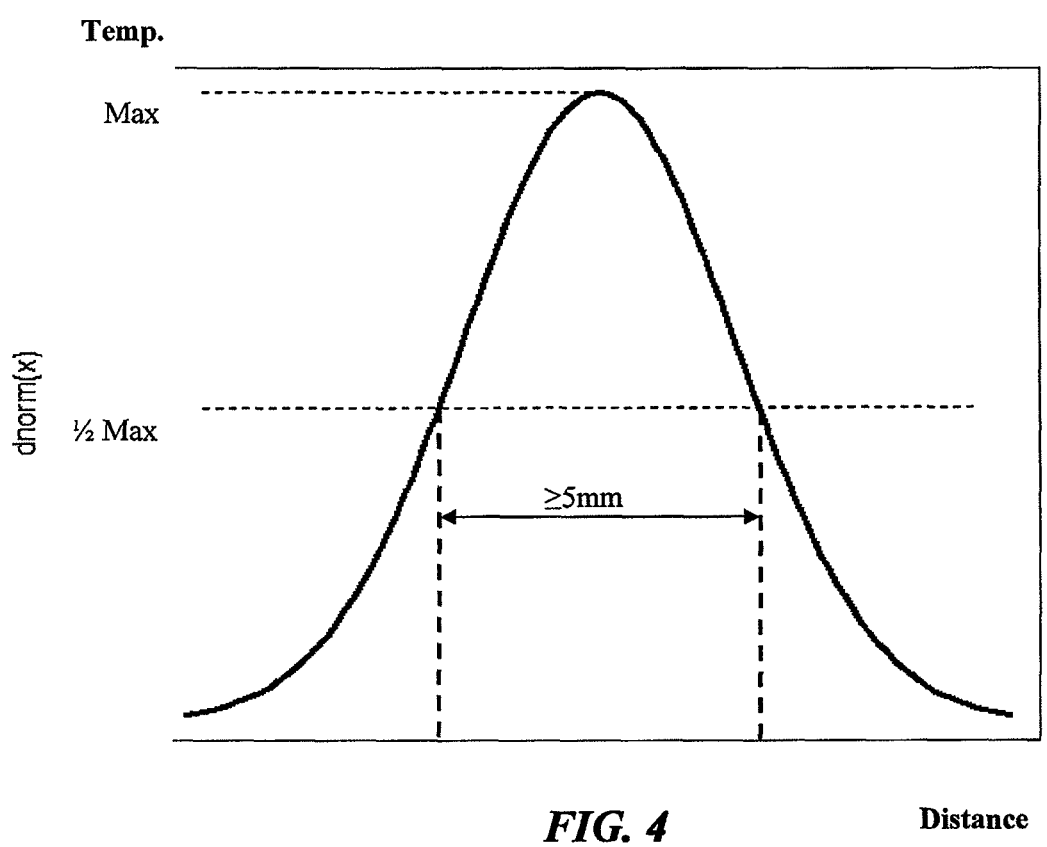
FIG. 4 is a plot showing a Gaussian thermal profile of the plasma field produced by the multi-stage 3 electrode heat sources in FIGS. 3A and 3B.

A multiphase drive circuit drives the six electrodes (3 per heat source stage) to form a three-dimensional glow discharge in the form of extend heat zone 50, completely surrounding the fiber 10 for a length of easily up to 0 mm to 10 mm, as is shown by the Gaussian heat distribution of FIG. 4. The preferred heat zone width may be about 3 mm. There is no inherent limitation of the heat zone width, and more than two stages of heat sources could be used to further expand the heat zone. The two triangular sets of three electrodes can be aligned and driven 120° displaced in phase, or rotationally offset by 60° with their tips forming an irregular octahedron. The spacing between the two sets may be adjusted to control the axial extent of the heated plasma vortex. Electronic adjustments to the drive waveforms can significantly alter the heat distribution transferred to the fiber or device. This system can also be operated as one or two independent three-phase planar systems.

With most conventional heat sources, including the "Ring of Fire®", the axial distribution of heat is essentially Gaussian, and the width of the effective heat zone cannot be changed during operation. The six-electrode system opens new possibilities, as the heat distribution is controlled by the relative phase of different features of the drive waveforms, and can be altered asymmetrically and in real time. This will provide more flexible heat application for dissimilar-fiber splices and tapering. As described previously, for a narrow, symmetrical heat source, the geometry of a taper is defined by the motion and acceleration of the two segments of fiber on either side of the molten zone. A heat source with an axial extent of several millimeters and an asymmetrical heat zone can produce tapers defined by temperature distribution rather than acceleration.

FIGS. 5-8 show waveforms and schematic diagrams that can be used to control a single 3 electrode heat source, as examples. When using two (or more) 3 electrode heat sources to create an extended heat zone, different waveforms and schematics will result, which can be extrapolated from those shown in FIGS. 5-8. FIGS. 5-8 are, therefore, provided as basis for such extrapolation in an exemplary embodiment.

Figure 5:
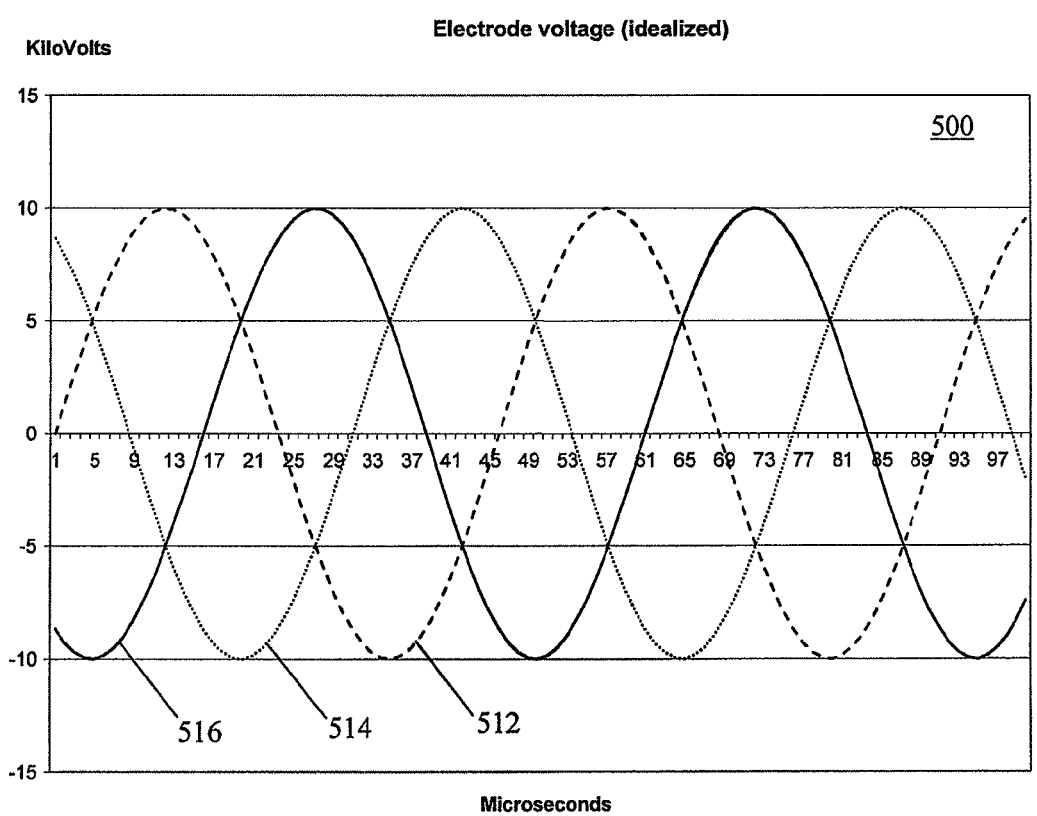
FIG. 5 is a graph showing the relative sinusoidal phase of the three electrodes of FIGS. 2A, 2B, 3A and 3B.

FIG. 5 is a graph 500 that shows an example of voltages which could be provided at the electrodes 102, 104, and 106 to create a three-phase arc, as shown in FIGS. 2A, 3B, 3A and 3B. The example shown has an overall frequency of approximately 22 kHz with a peak-to-peak voltage of 20 kV. Plot 512 is for electrode 102, plot 514 is for electrode 104, and plot 516 is for electrode 106.

In the example, there is an arc present between electrodes 104 and 106 at time 0 µs, see plots 514 and 516. At approximately 6 µs, the arc shifts to the space between electrodes 102 and 106, see plots 512 and 516. At 13 µs, the arc moves to electrodes 512 and 514, see plots 512 and 514, and so forth. At any given time, an arc should be present between two electrodes with the greatest potential difference between them. The rotating phase sequence takes place so rapidly that the arc appears to be constantly on, and substantially constant heating is provided, as the thermal time constants of the fiber and surrounding air are substantially longer than the oscillation period of the arc.

Figure 6:
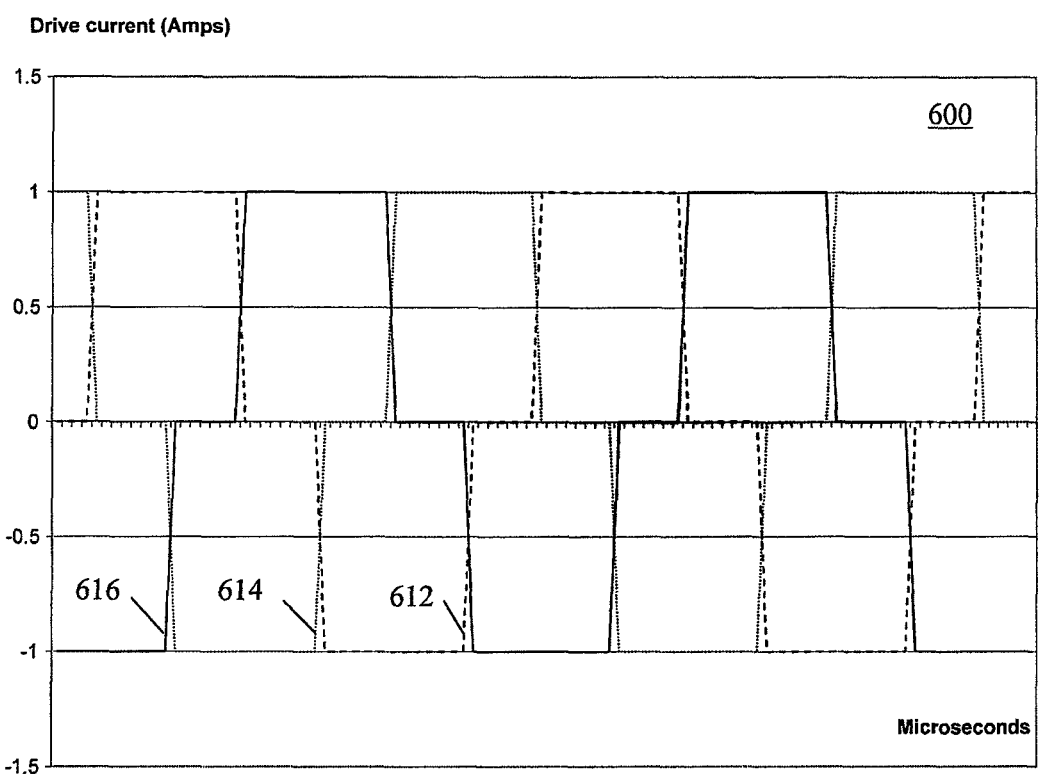
FIG. 6 is a graph showing a preferred waveform for the current applied to a set of transformer primaries to achieve the results in FIG. 5.

It can be extremely difficult to actually control the voltage at the electrodes. However, a far more practical method of controlling current to the primary of the step-up transformer can be applied in the illustrative embodiment. FIG. 6 shows graph 600 having a preferred waveform for the current applied to the transformer primaries. This system of drive currents will produce output voltage waveforms roughly corresponding to those shown in FIG. 5, producing a controllable three-phase arc.

The primary drive currents for the transformers require three waveforms disposed at 0 degrees phase, 120 degrees phase, and 240 degrees phase. These can be generated by well-known digital or analog means, such as a ring counter. In graph 400, plot 412 is for electrode 102, plot 414 is for electrode 104, and plot 416 is for electrode 106.

Figure 7:
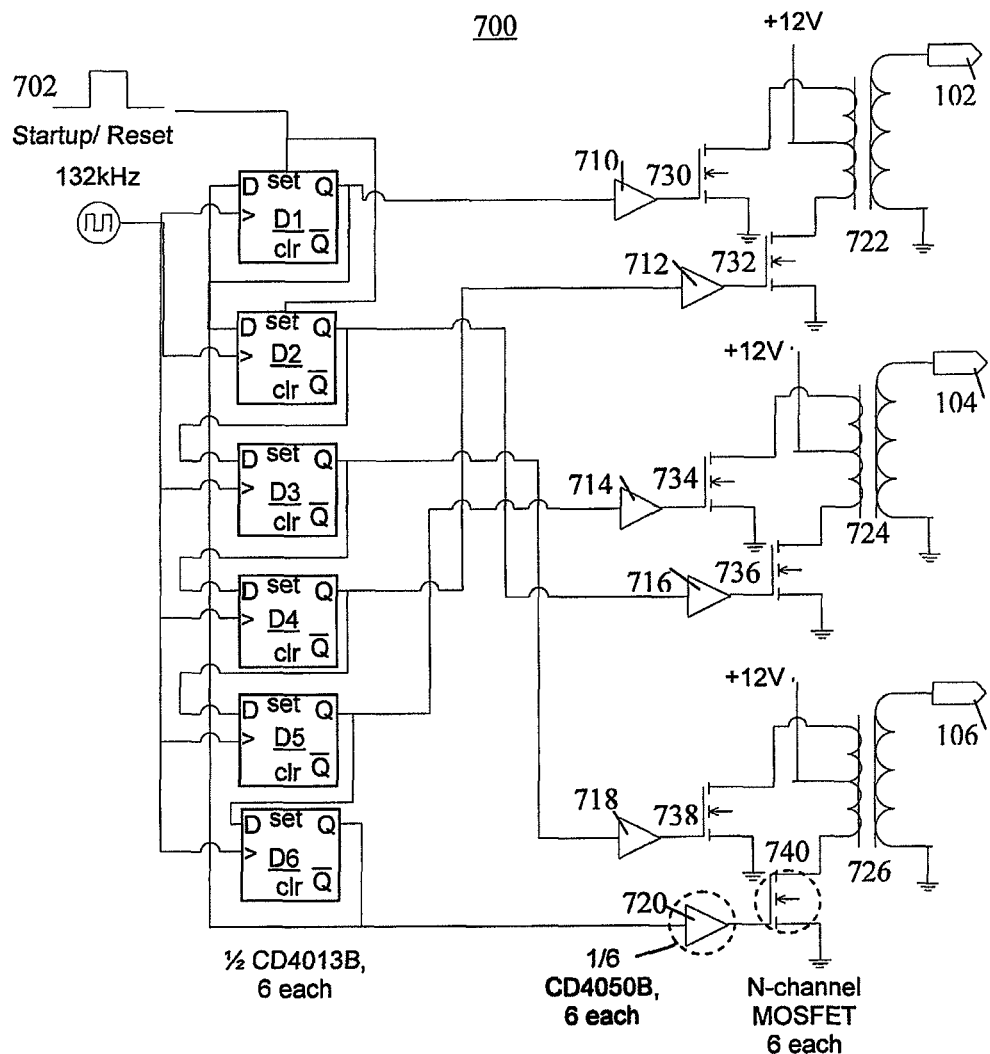
FIG. 7 is a schematic diagram of an embodiment of a circuit for driving the three electrodes in a 3 electrode heat source, as shown in FIGS. 2A, 2B, 3A and 3B.

FIG. 7 is schematic diagram of an embodiment of a circuit 700 configured to drive the three electrodes 102, 104, and 106 of FIGS. 2A, 2B, 3A and 3B. Six D-type flip-flops D1-D6 are configured to implement a circular shift register. A short startup pulse 702 is applied to initialize the circuit 700. Initially, electrode 102 is positive and electrode 104 is negative, but then each sequences through the various phase states. As an example, the overall frequency can be ⅙ of the clock frequency of 132 KHz in this embodiment. In other embodiments, this can differ, preferably maintaining a substantially uniformly or evenly heated plasma field. Current control circuitry (not shown) can be substituted for the CD4050 buffers 710, 712, 714, 716, 718, and 720.

The required voltages could be generated from three separate 10CT:780 high voltage transformers 722, 724, and 726, or from a tuned LC configuration wound on a single core. It is also possible for the three transformer 722, 724, and 726 secondaries to be connected in a "delta" configuration, wherein the secondary coils are connected between adjacent pairs of electrodes, rather than being referenced to ground as in FIG. 7.

In FIG. 7, MOSFETS 730, 732, 734, 736, 738, and 740 drive transformers 722, 724, and 726. In accordance with various aspects of the invention, the multi-electrode system can include a dead-band feature to increases efficiency and reduce dissipation in the drive transistors/MOSFETs 730, 732, 734, 736, 738, and 740, by preventing overlap in conduction between the "positive-driving" and "negative-driving" devices. The dead-band feature can also provide a mechanism for adjusting arc power (e.g., by varying the width of the dead-band). The dead-band feature can also enable cleaner transitions between states of the arcs, by allowing an existing arc to extinguish momentarily before establishing the next arc in the phase sequence.

The dead-band feature can be implemented by producing the controlled current waveforms to include two dead-bands of 1% to 49% of the period of the cycle, wherein there is substantially no current flow through the transformer primary.

Another embodiment of a three electrode system can generate an arc of substantially the same properties as that of the three electrode system described above with respect to FIGS. 2A, 2B, 3A, and 2B, but with one grounded electrode and only two powered electrodes.

In one embodiment, electrodes 102 and 104 are powered and electrode 106 is grounded. At a particular degree of phase separation (between 0° and 180°) between the voltage waveforms applied to electrodes 102 and 104, with electrode 106 grounded, all three arcs 112, 114, 116 would be formed at substantially equal intensity. A theoretical analysis (based on vector mathematics) suggests that this would occur at 60° relative phase. In implementation, it has been found necessary to vary the phase between approximately 40° and 160°, depending on various implementation factors, such as the frequency and power of the drive waveforms and the spacing and condition of the electrodes.

Figure 8:
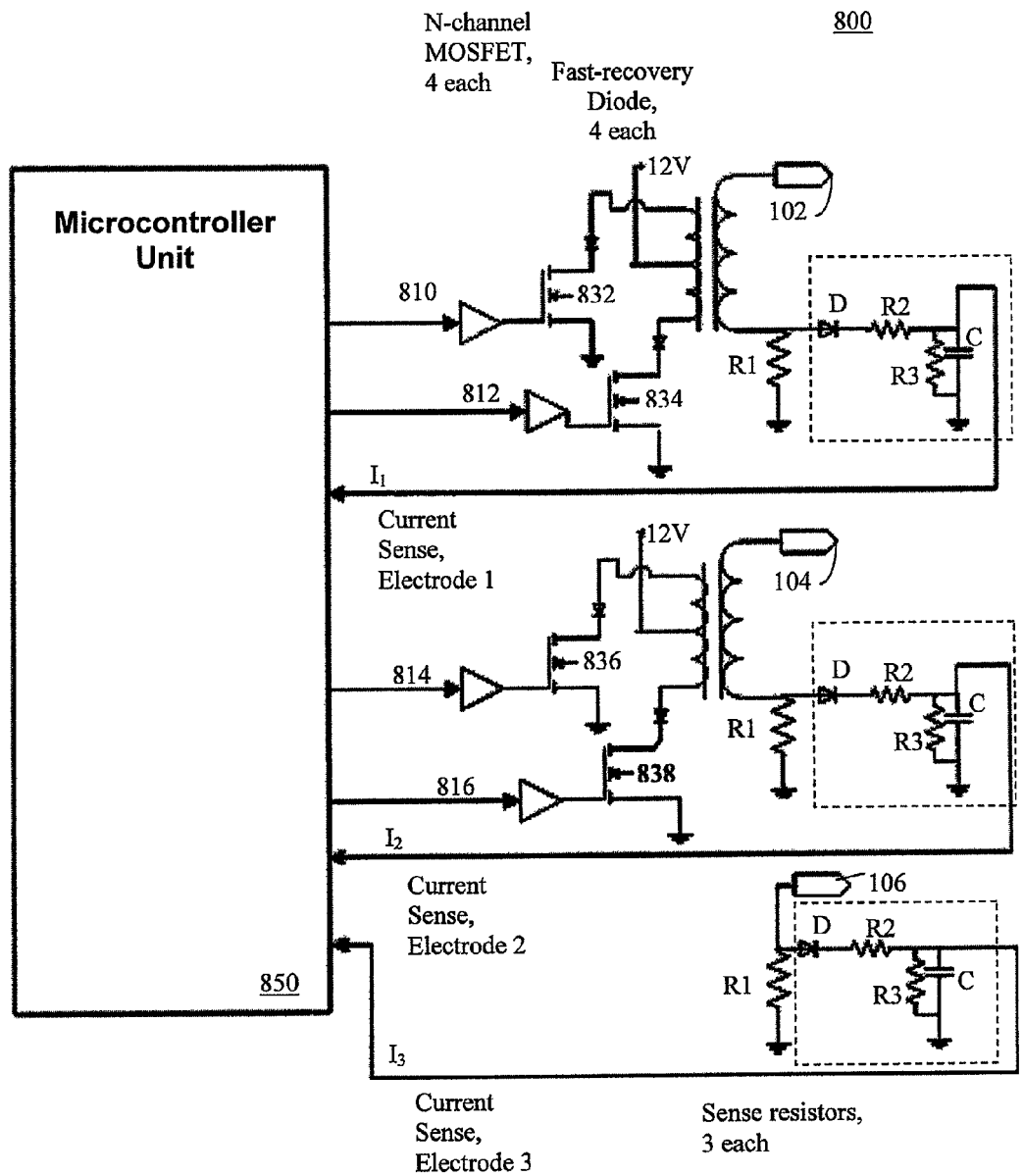
FIG. 8 is a schematic diagram of an embodiment of a circuit for driving the two of three electrodes in a 3 electrode heat source, as shown in FIGS. 2A, 2B, 3A and 3B.

FIG. 8 is a schematic diagram of an embodiment of a circuit 800 for driving the three electrode arrangements of FIGS. 2A, 2B, 3A, and 3B. The embodiment in FIG. 8 is similar to that of FIG. 7 in terms of buffers, MOSFETs and transformers, but unlike FIG. 7, in FIG. 8 the third electrode 106 is tied to ground and does not include the buffer, MOSFET, and transformer circuitry.

In the embodiment of FIG. 8, the signals which turn the drive MOSFETs 832, 834, 836, and 838 on and off can be generated by a programmable microcontroller unit 850, and provided via buffers 810, 812, 814, and 816. As examples, the MOSFET drivers 832, 834, 836, and 838 can be MC34151 (or similar) MOSFETs and the microcontroller 850 can be a PAL18F2520 manufactured by Microchip, Inc. This circuit of this embodiment allows real-time control and adjustment of the duration and phase relationship of the drive signals. The real-time adjustments can be made with the goal of maintaining arcs 112, 114, and 116 substantially equal in intensity or to deliberately alter their relative intensity for various purposes.

In order for the microcontroller 850 to be able to sense the arc intensities, small-value resistors R1 (for example, 100 Ohm resistors) can be connected in series with the ground return of each drive signal. A voltage develops across the resistor R1 in direct proportion to the arc current delivered by the electrode 102. A sense resistor R1 is provided for each electrode. For example, a 20 mA current from electrode 102 would result in a 2V signal across the 100 Ohm sense resistor R1.

The sense resistor signals are in the form of high-frequency AC voltages. It is possible to rectify and filter these signals to produce DC voltages, which are more suitable for measurement by the microcontroller unit 850.

The simple rectification/filtering networks shown include a diode D, two resistors R2 and R3, and a capacitor C, and are provided for each of the three electrodes. This network produces a voltage proportional to the arithmetic mean (i.e., average) of the absolute value of the sense resistor voltage. If greater accuracy is required, well-known means can be used to produce a voltage proportional to the quadratic mean (e.g., root-mean-square or RMS) of the sense resistor voltage. The RMS value is a better measurement of the power delivered into the arc, which may be important in some applications.

An additional improvement to the embodiment can be to make the power supply adjustable, which is shown as "12V" in FIG. 8. An adjustable "buck regulator" circuit, well-known in the art, can adjust the voltage downward from 12V to a very low voltage (e.g. 1V) or any desired intermediate voltage. This can be useful when an arc of very low power is required, as it has been found that very low pulse widths to the MOSFET's (the previous method of obtaining low power operation) can result in unstable arc operation. Alternatively, a lower input voltage and/or lower transformer step-up ratio can be used in conjunction with a boost-type regulator to provide an equivalent range of voltages.

In some embodiments, each of the 6 electrodes in FIGS. 3A and 3B can be driven by its own transformer. For instance, each heat source HS1 and HS2 could use the circuitry of FIG. 7 or 8.

In yet other embodiments, two electrodes, one from each 3 electrode heat source, can share a transformer and the other four electrodes can each have its own transformer. For example, referring to FIG. 7, each heat source HS1 and HS2 could share the third transformer for electrode 106 in each 3 electrode heat source. And electrodes 102 and 104 could have their own respective transformers.

Figure 9:
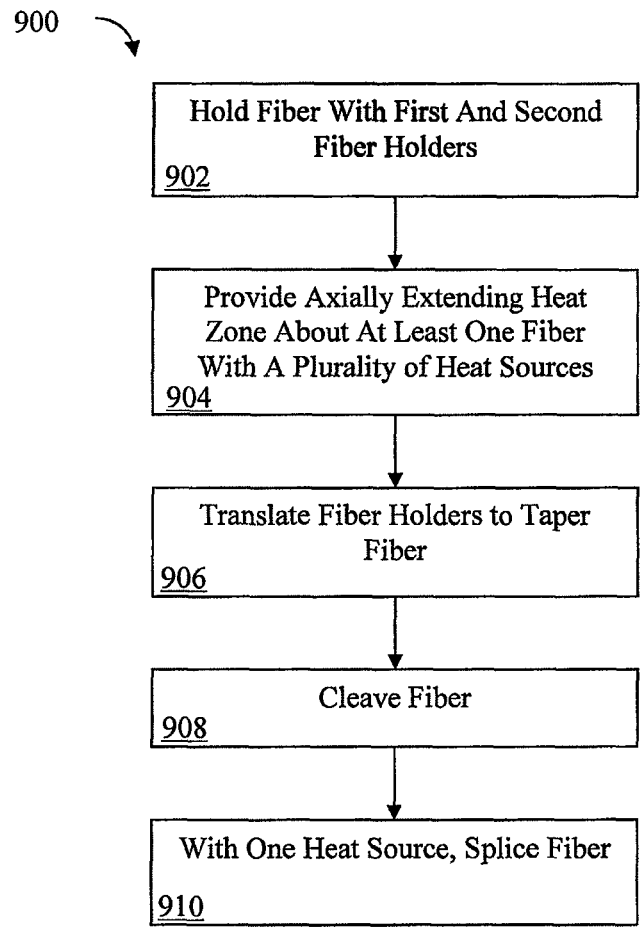
FIG. 9 provides a flow chart of an embodiment of a method processing at least one optical fiber, in accordance with aspects of the present invention.

FIG. 9 provides a flow chart of an embodiment of a method processing at least one optical fiber 900, in accordance with aspects of the present invention. Method 900 can be implemented using the system 70 of FIG. 1, as an example. Step 902 includes holding respective portions of at least one fiber with first and second fiber holders. And step 904 includes providing an axially extending heat zone about at least one fiber with a plurality of heat sources arranged between the first and second fiber holders. The extended heat zone is preferably isothermic.

Tapering can be accomplished, in step 906, by selectively translating the first and second fiber holder away from each other. The method can further comprise cleaving the at least one fiber, step 908, and splicing the at least one fiber with only one of the plurality of heat sources, step 910.

It will be apparent that there are other possible arrangements of the electrodes that are within the spirit and scope of the invention. These alternative arrangements may be preferable in circumstances where it is desired to change the pattern of heating of the fiber, or where an alternative arrangement facilitates the positioning of the electrodes with respect to other equipment in a larger system.

In various embodiments, more than two stages of heat sources could be used, and each heat source does not have to be of the same type. The heat source can take the form of any known or later developed heat source. For example, the heat source can be a two electrode heat source. The heat source can include a flame. The flame can be applied directly to the fiber, or applied to a crucible that surrounds the fiber. The heat source can be a filament heat source that substantially surrounds the fiber. The filament heat source can include a Tungsten or graphite filament. The laser can be a 10 μm $CO_2$ laser. Preferably, the heat sources provide a substantially uniform heated field about the fiber, unless there is a particular reason not to have a uniform field. Multi-electrode heat sources are narrow and highly controllable, so lend themselves to a relatively high degree of control.

The various techniques known for improving and controlling arc performance with conventional two-electrode systems can also be applied or adapted to embodiments, including pulse width modulation, ion injection, feedback control, etc. The electrodes can also be fitted with shields or focusing sleeves or other technologies intended to alter arc distribution. Known arc bending techniques utilizing dielectrics inserted near the plasma field can also be used.

The principles of the present invention could also be extended to a system of four or more electrodes, as example, but three electrodes provide a deterministic arc sequence and substantially even heating. The system could also use 2 electrode heat sources, but again, three electrode heat sources are presently preferred.

While the foregoing has described what are considered to be the best mode and/or other preferred embodiments, it is understood that various modifications can be made therein and that the invention or inventions can be implemented in various forms and embodiments, and that they can be applied in numerous applications, only some of which have been described herein. It is intended by the following claims to claim that which is literally described and all equivalents thereto, including all modifications and variations that fall within the scope of each claim.

What is claimed is:

1. A multi-stage fiber processing system, comprising:
   first and second fiber holders configured to hold respective portions of at least one fiber; and
   a plurality of heat sources arranged between the first and second fiber holders and configured to provide a substantially uniform heat zone that extends axially between the heat sources about the at least on fiber,
   wherein the plurality of heat sources includes two 3 electrode heat sources.

2. The system of claim 1, wherein at least one heat source of the plurality of heat sources is a multi-electrode heat source.

3. The system of claim 1, wherein at least one of the 3 electrode heat sources comprises 3 electrodes in a "Y" configuration.

4. The system of claim 1, wherein at least one of the 3 electrode heat sources comprises 3 electrodes in a "T" configuration.

5. The system of claim 1, wherein for each 3 electrode heat source, a first arc is formed between a first electrode and a second electrode, a second arc is formed between the second electrode and a third electrode, and a third arc is formed between the third electrode and the first electrode.

6. The system of claim 1, wherein the two 3 electrode heat sources are disposed in a 22" to 24" Hg gauge vacuum, 200 to 150 torr absolute.

7. The system of claim 1, wherein the two 3 electrode heat sources can be disposed in an oxygen-enriched partial vacuum with plasma at a temperature of not more than about 400° C.

8. The system of claim 1, wherein the plurality of heat sources includes two 3 electrode heat sources configured to generate nine arcs, including 3 arcs between the two 3 electrode heat sources.

9. The system of claim 8, wherein each of the nine arcs is independently controlled.

10. The system of claim 8, wherein the system is configured to rotate the 3 arcs between the two 3 electrode heat sources in a clockwise direction about an axis of the at least one fiber.

11. The system of claim 8, wherein the system is configured to rotate the 3 arcs between the two 3 electrode heat sources in a counterclockwise direction about the axis of the at least one fiber.

12. The system of claim 8, further comprising a different transformer configured to drive each electrode of each of the 3 electrode heat sources.

13. The system of claim 8, further comprising a common transformer configured to drive at least one electrode from each of the 3 electrode heat sources.

14. The system of claim 1, wherein heat zone has a temperature up to about 3000° C.

15. The system of claim 1, wherein the heat zone has a width in a range of 1 mm to 10 mm.

16. The system of claim 1, wherein the heat zone is about 3 mm.

17. The system of claim 1, wherein the first fiber holder and second fiber holder are translatable away from the heat zone.

18. The system of claim 1, wherein the heat zone is a substantially uniform heated plasma field.

19. The system of claim 1, wherein the heat zone is substantially isothermic.

20. The system of claim 1, wherein the at least one fiber is a fiber bundle.

21. The system of claim 1, wherein the at least one fiber is a large diameter fiber of 400 μm to 600 μm.

22. A method of fiber processing, comprising:
    holding respective portions of at least one fiber with first and second fiber holders; and
    providing a substantially uniform heat zone about the at least one fiber extending axially between a plurality of heat sources arranged between the first and second fiber holders,
    wherein the plurality of heat sources includes two 3 electrode heat sources.

23. The method of claim 22, further comprising:
    tapering the at least one fiber by selectively translating the first and second fiber holder away from each other.

24. The method of claim 22, further comprising:
    cleaving the at least one fiber; and
    splicing the at least one fiber with only one of the plurality of heat sources.

25. The method of claim 22, wherein each 3 electrode heat source comprises 3 electrodes in a "Y" configuration.

26. The method of claim 22, wherein each 3 electrode heat source comprises 3 electrodes in a "T" configuration.

27. The method of claim 22, wherein forming the heat zone comprises, for each 3 electrode heat source:
    generating a first arc is formed between a first electrode and a second electrode;
    generating a second arc is formed between the second electrode and a third electrode; and
    generating a third arc is formed between the third electrode and the first electrode.

28. The method of claim 22, disposing the two 3 electrode heat sources in a 22" to 24" Hg gauge vacuum, 200 to 150 torr absolute.

29. The method of claim 22, wherein the plurality of heat zones includes two 3 electrode heat sources generating nine arcs, including forming 3 arcs between the two 3 electrode heat sources.

30. The method of claim 29, further comprising independently controlling each of the nine arcs.

31. The method of claim 29, further comprising rotating 3 arcs between the two 3 electrode heat sources about an axis of the at least one fiber in a clockwise direction.

32. The method of claim 29, further comprising rotating the 3 arcs between the two 3 electrode heat sources about an axis of the at least one fiber in a counterclockwise direction.

33. The system of claim 29, further comprising a different transformer configured to drive each electrode of each of the 3 electrode heat sources.

34. The system of claim 29, further comprising a common transformer configured to drive at least one electrode from each of the 3 electrode heat sources.

35. The method of claim 22, wherein the heat zone has a temperature up to about 3000° C.

36. The method of claim 22, wherein the heat zone has a width in a range of 1mm to 10 mm.

37. The method of claim 22, wherein the heat zone is about 3 mm.

38. The method of claim 22, further comprising translating the first fiber holder and second fiber holder away from the heat zone.

39. The method of claim 22, wherein the heat zone is a substantially uniform heated plasma field.

40. The method of claim 22, wherein the at least one fiber is a large diameter fiber of 400 μm to 600 μm.

41. The method of claim 22, wherein the heat zone is substantially isothermic.

42. The method of claim 22, wherein the at least one fiber is a fiber bundle.

43. The method of claim 22, wherein the at least one fiber is a large diameter fiber in a range of about 400 μm to 600 μm.

44. A multi-stage fiber tapering system comprises:
   first and second fiber holders configured to hold respective portions of at least one fiber and to translate away from each other; and
   first and second 3 electrode heat sources arranged between the first and second fiber holders and configured to provide a substantially uniform heat zone that extends axially between the heat sources about the at least on fiber, the heat zone being a substantially uniform heated plasma field.

45. The system of claim 44, wherein for each 3 electrode heat source, a first arc is formed between a first electrode and a second electrode, a second arc is formed between the second electrode and a third electrode, and a third arc is formed between the third electrode and the first electrode.

46. The system of claim 44, further comprising a different transformer configured to drive each electrode of each of the 3 electrode heat sources.

47. The system of claim 44, further comprising a common transformer configured to drive at least one electrode from each of the 3 electrode heat sources.

48. The system of claim 44, further comprising at least one stepper motor arranged to translate at least one of the first and second fiber holders.

49. The system of claim 44, wherein the at least one fiber is a fiber bundle.

50. The system of claim 44, wherein the at least one fiber is a large diameter fiber of 400 μm to 600 μm.

51. The system of claim 44, wherein the plurality of heat sources includes two 3 electrode heat sources configured to generate nine arcs, including 3 arcs between the two 3 electrode heat sources.

52. The system of claim 51, wherein each of the nine arcs is independently controlled.

53. The system of claim 51, wherein the system is configured to rotate the 3 arcs between the two 3 electrode heat sources in a clockwise direction about an axis of the at least one fiber.

54. The system of claim 51, wherein the system is configured to rotate the 3 arcs between the two 3 electrode heat sources in a counterclockwise direction about the axis of the at least one fiber.

* * * * *

UNITED STATES PATENT AND TRADEMARK OFFICE
CERTIFICATE OF CORRECTION

| | | |
|---|---|---|
| PATENT NO. | : 9,028,158 B2 | Page 1 of 1 |
| APPLICATION NO. | : 13/354090 | |
| DATED | : May 12, 2015 | |
| INVENTOR(S) | : Robert G. Wiley et al. | |

It is certified that error appears in the above-identified patent and that said Letters Patent is hereby corrected as shown below:

In The Claims

Column 13, line 34, Please delete the word "on" add the word --one--

Column 16, line 1, Please delete the word "on" and add the word --one--

Signed and Sealed this
Seventeenth Day of November, 2015

Michelle K. Lee
*Director of the United States Patent and Trademark Office*